United States Patent [19]

Wilson et al.

[11] Patent Number: 5,595,834
[45] Date of Patent: *Jan. 21, 1997

[54] ANNULAR FEED AIR BREATHING FUEL CELL STACK

[75] Inventors: Mahlon S. Wilson, Los Alamos, N.M.; Jay K. Neutzler, Peoria, Ariz.

[73] Assignee: The Regents of the University of Calif., Alameda, Calif.

[*] Notice: The term of this patent shall not extend beyond the expiration date of Pat. No. 5,514,486.

[21] Appl. No.: 587,430

[22] Filed: Jan. 17, 1996

Related U.S. Application Data

[63] Continuation-in-part of Ser. No. 522,885, Sep. 1, 1995, Pat. No. 5,514,486.
[51] Int. Cl.⁶ .................................................. H01M 8/10
[52] U.S. Cl. ........................... 429/30; 429/32; 429/38; 429/31
[58] Field of Search ................................ 429/30–34, 38, 429/39, 26

[56] References Cited

U.S. PATENT DOCUMENTS

| | | | |
|---|---|---|---|
| 4,824,742 | 4/1989 | Parry | 429/30 |
| 5,158,837 | 10/1992 | Misawa et al. | 429/34 |
| 5,176,967 | 1/1993 | Ishihara et al. | 429/31 |
| 5,185,219 | 2/1993 | Ishihara et al. | 429/31 |
| 5,186,806 | 2/1993 | Clark et al. | 204/265 |
| 5,211,984 | 5/1993 | Wilson | 427/115 |
| 5,234,777 | 8/1993 | Wilson | 429/33 |

OTHER PUBLICATIONS

K. Prater, "Solid polymer fuel cell developments at Ballard" Journal of Power Sources, 37, 181–188 (1992) (Month not avail).

J. K. Neutzler et al., "Development of a Portable, Air-Breathing Polymer Electrolyte Fuel Cell Stack," printed in Extended Abstracts, Electrochemical Society Meeting, vol. 94-2, p. 961 (Oct. 1994).

*Primary Examiner*—Anthony Skapars
*Attorney, Agent, or Firm*—Ray G. Wilson

[57] ABSTRACT

A stack of polymer electrolyte fuel cells is formed from a plurality of unit cells where each unit cell includes fuel cell components defining a periphery and distributed along a common axis, where the fuel cell components include a polymer electrolyte membrane, an anode and a cathode contacting opposite sides of the membrane, and fuel and oxygen flow fields contacting the anode and the cathode, respectively, wherein the components define an annular region therethrough along the axis. A fuel distribution manifold within the annular region is connected to deliver fuel to the fuel flow field in each of the unit cells. The fuel distribution manifold is formed from a hydrophilic-like material to redistribute water produced by fuel and oxygen reacting at the cathode. In a particular embodiment, a single bolt through the annular region clamps the unit cells together. In another embodiment, separator plates between individual unit cells have an extended radial dimension to function as cooling fins for maintaining the operating temperature of the fuel cell stack.

16 Claims, 5 Drawing Sheets

ANNULAR FEED AIR BREATHING FUEL CELL STACK

RELATED CASES

This application is a continuation-in-part of U.S. patent application Ser. No. 08/522,885, filed Sep. 1, 1995, now U.S. Pat. No. 5,514,486.

BACKGROUND OF THE INVENTION

This invention relates to polymer electrolyte fuel cells, and, more, particularly to air-breathing polymer electrolyte fuel cells. This invention was made with government support under Contract No. W-7405-ENG-36 awarded by the U.S. Department of Energy. The government has certain rights in the invention.

Fuel cell systems developed to date have generally been relatively high power, sophisticated and costly systems intended for space and transportation applications. These systems require a number of subsystems to serve such needs as cooling, humidification/water management, and reactant pressurization, all of which must be integrated with one another to attain optimal performance from the assembled fuel cell stack.

An emerging class of polymer electrolyte fuel cells (PEFCs) is designed for low power applications, such as now served by conventional batteries. The PEFC has attractive features of energy density and ease of refueling that make the PEFC attractive for a number of such applications. But a relatively low-cost, unsophisticated fuel cell is needed that is not humidified, cooled, or pressurized. In a simple embodiment, air (oxygen) is supplied to a cathode by diffusion from the fuel cell periphery so that there is no requirement for forced convection through the flow-field to replenish the depleted oxygen. That is, the fuel cell stack is "air-breathing."

It will be appreciated that such simple fuel cell stacks are useful in a number of military, commercial, and consumer applications. The specific energy of the system can be tailored for a particular device with the appropriate choice and size of hydrogen storage medium. For example, some applications might desire the simplicity and relatively high energy density of pressurized hydrogen storage. On the other hand, concerns for consumer safety can be met with the use of a metal hydride container for the storage of the hydrogen fuel.

An appropriate fuel cell for these types of applications is the PEFC. When compared to other types of fuel cells such as phosphoric acid, molten carbonate, or solid oxide, the PEFC possesses substantial advantages because of its combination of low temperature operation, ability to start-up quickly, simplicity, and benign electrolyte.

Air-breathing fuel cell stacks designed to-date are smaller versions of the higher powered pressurized stacks. In most cases, the air cathodes are not manifolded, but consist of plates with large, vertically oriented grooves that allow the ambient air to flow upward through the warm stack by a chimney effect. While such cells are capable of good performance, the performance may be erratic. While the considerable amount of free convection that is incurred by the chimney effect delivers substantial amounts of oxygen, it can also remove substantial amounts of water. Hence, the cells tend to dry out unless special additional precautions are taken, e.g., a water reservoir that must be periodically replenished. The cells may also tend to overheat when run at high power and the chimney effect is disrupted if the cells are tilted, resulting in a loss of power.

Accordingly, one object of the present invention is a PEFC air-breathing stack configuration is provided that is relatively independent of stack orientation.

It is another object of the present invention to minimize water loss and drying of the cell.

Yet another object of the present invention is to minimize over-heating of the cell.

One other object of the present invention is to provide a PEFC stack with a simple geometry and of minimum size and weight.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a polymer electrolyte fuel cell where the fuel cell components define a periphery and are distributed along a common axis. The fuel cell components include a polymer electrolyte membrane, an anode and a cathode contacting opposite sides of the membrane, and fuel and oxygen flow fields contacting the anode and the cathode, respectively, wherein the components define an annular region therethrough along the axis. A fuel distribution manifold within the annular region is connected to deliver fuel to the fuel flow field. The fuel distribution manifold is a hydrophilic-like material for redistributing water produced by fuel and oxygen reacting as the cathode.

In another aspect of the present invention, a stack of polymer electrolyte fuel cells is formed from a plurality of unit cells where each unit cell includes fuel cell components defining a periphery and distributed along a common axis, where the fuel cell components include a polymer electrolyte membrane, an anode and a cathode contacting opposite sides of the membrane, and fuel and oxygen flow fields contacting the anode and the cathode, respectively, wherein the components define an annular region therethrough along the axis. A fuel distribution manifold within the annular region is connected to deliver fuel to the fuel flow field in each of the unit cells. The fuel distribution manifold is a hydrophilic-like material for redistributing water produced by fuel and oxygen reacting at the cathode.

In one other aspect of the present invention, unit fuel cells are separated by separator plates that extend beyond the unit cell periphery to serve as cooling fins to remove heat generated within the unit cells.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with the present invention, a polymer electrolyte fuel cell (PEFC) is provided with the fuel supply outward from an axial central annulus and the oxygen supply inward from the cell periphery. In a preferred geometry, circular flow-field and electrode plates are used to provide a symmetric configuration that is relatively lightweight and easy to manufacture. With the single annular manifold for fuel supply, the entire periphery is free to oxygen access, which diffuses toward the center through a porous flow-field. Typically, the fuel is hydrogen and the oxygen is oxygen in ambient air.

The application of a diffusion process for the oxygen supply acts to limit the supply to the active sites, which limits the reaction. The porous flow-field also limits the outward diffusion of the reaction product water, thus minimizing water loss and drying effects on the cell. Since each molecule of oxygen diffusing inward produces two water molecules that diffuse outward at steady-state conditions, it will be appreciated that the cell design allows the influx of sufficient oxygen while limiting the escape of water vapor such that the system maintains the desired high hydration level. In addition, the absence of manifold seals at the periphery of all but the anode flow-fields and separator plates extending beyond the unit cell periphery to function as cooling fins, allow greater conduction of reaction heat to the periphery to enhance cooling. In addition, the diffusion delivery of the reactants allows the performance of the cells to be relatively tolerant of stack orientation.

In terms of manufacturing advantages, all of the components of the stack, such as the flow-fields and seals, are radially symmetrical so fabrication and modifications are simple. In addition, this configuration provides a highly efficient utilization of the cross sectional area and smaller and lighter end-plates. Thus, the size of the complete fuel cell stack is less than might be obtained with more conventional designs.

Figure 1:
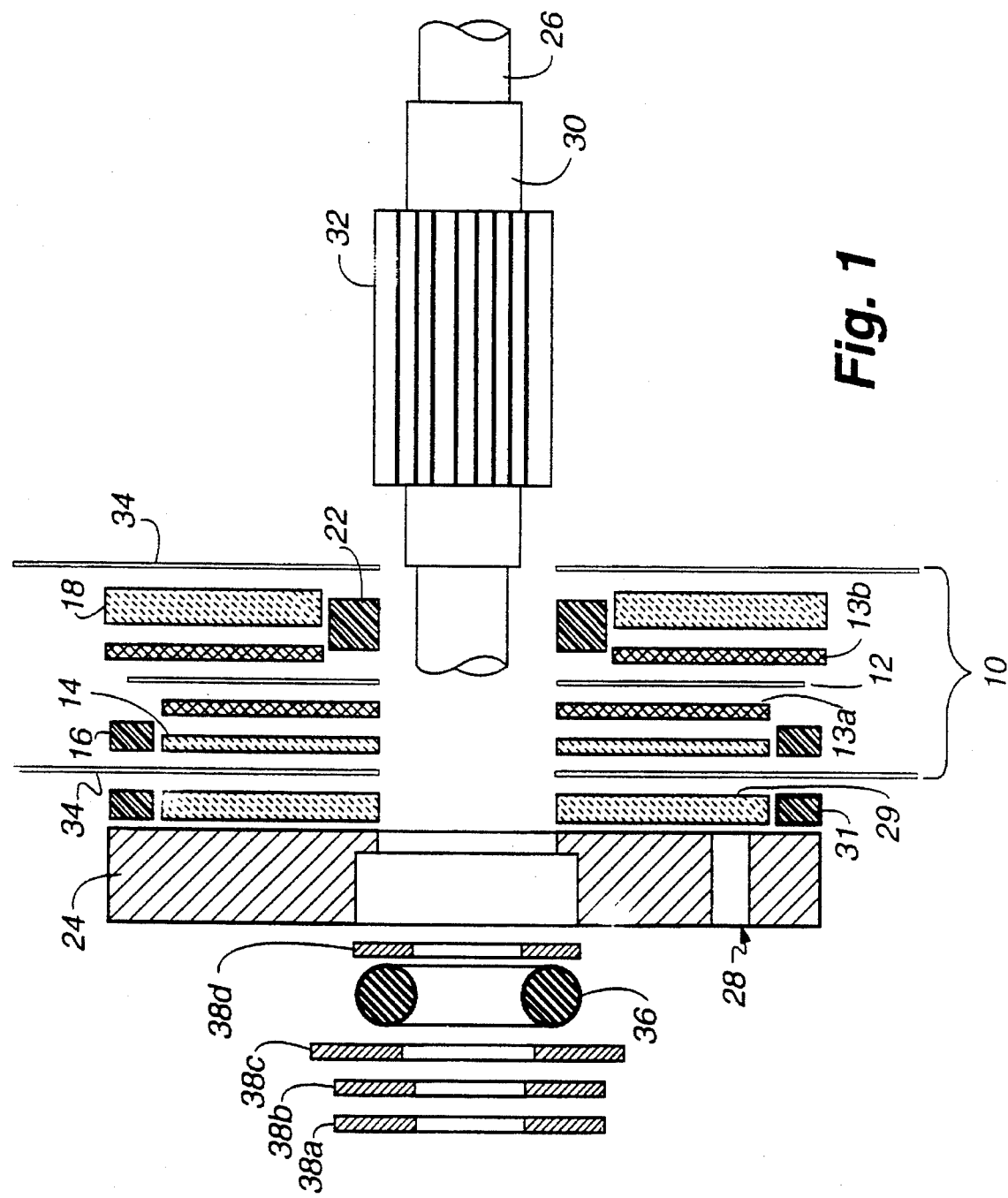
FIG. 1 is an exploded view of a fuel cell according to one embodiment of the present invention.

Referring now to FIG. 1, there is shown, in expanded, cross-sectional view, one embodiment of a unit fuel cell plus one end plate according to the present invention. Unit cell 10 includes catalyzed polymer electrolyte membrane assembly 12, e.g., a Dow or Nation membrane between porous electrodes, anode 13a and cathode 13b, such as a graphite cloth or paper, between fuel flow field plate 14 and oxygen flow field plate 18. Fuel flow field plate 14 is provided with an outer seal 16 with anode 13a to prevent the release of fuel from the cell periphery. Oxygen flow field plate 18 is provided with an inner seal 22 with cathode 13b to separate it from the fuel annulus.

Figure 2:
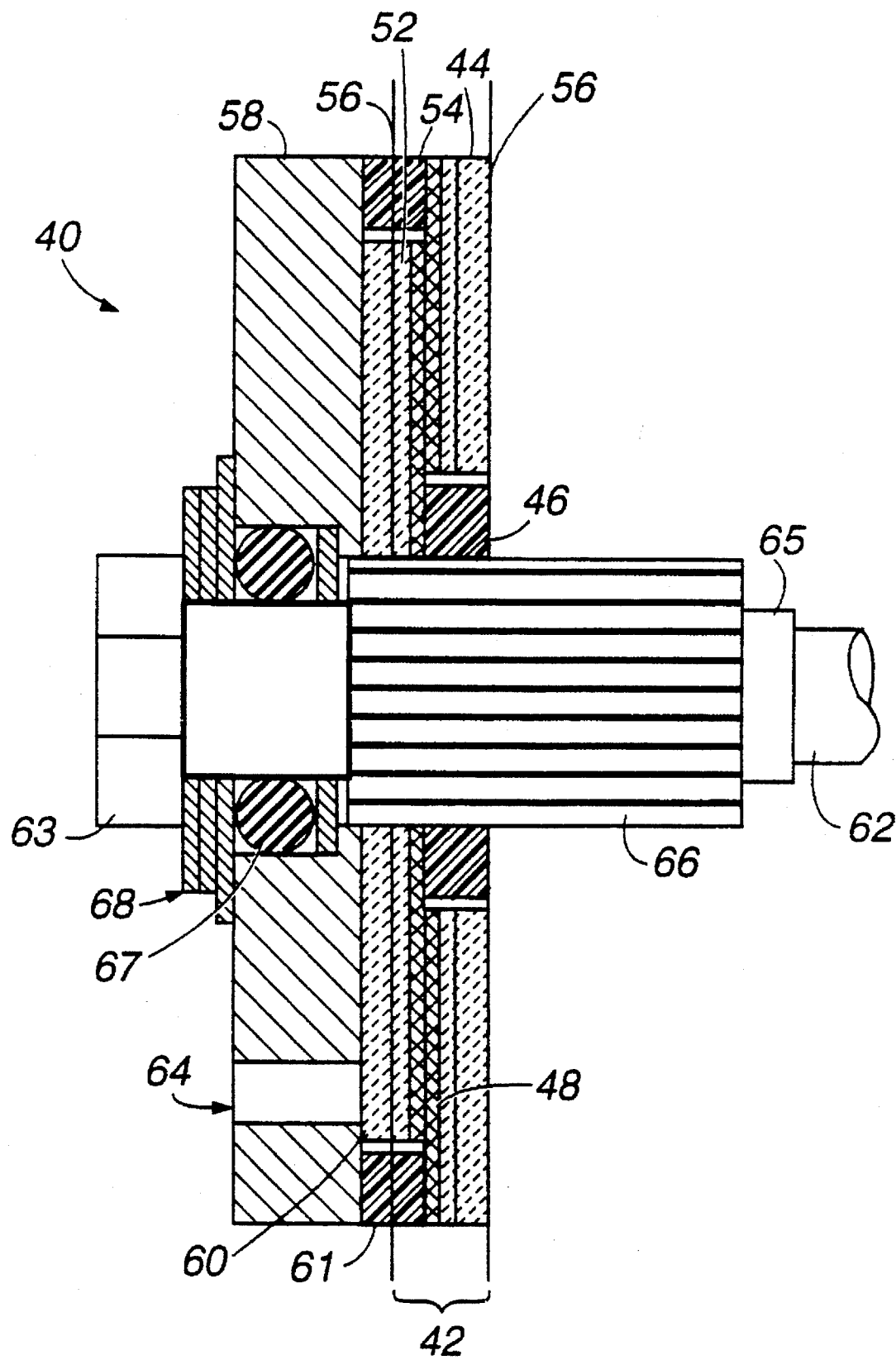
FIG. 2 is a cross-sectional view with exaggerated dimensions to show a stack of fuel cells shown in FIG. 1.

For a fuel cell at one end of a stack, end plate 24 is provided as a current collector plate and to compress the fuel cell components as discussed for FIG. 2. Fuel is introduced through port 28. In one embodiment a fuel diffusion flow field 29 with outer seal 31 is provided to distribute the fuel as described below.

Bolt 26 extends through the fuel cell components along the fuel cell axis. Insulating sleeve 30 shrouds bolt shank 26 to electrically isolate bolt 26 from end plate 24. The entrance of bolt 26 through end plate 24 is sealed by the compression of O-ring 36 between washers 38a–d. Sleeve 32 forms an axial annular region about bolt 26 and acts as a distribution manifold to distribute fuel from fuel inlet flow field 29 axially along fuel cell 10. Sleeve 32 is preferably formed of a hydrophilic or hydrophilic-treated porous tube. The preferred design includes axial channels along the periphery. Fuel flow is along the channels to fuel flow field 14. Water accumulates in and is distributed along the cell by the wicking action of porous tube 32. Thus, in a stack of unit cells 10, water does not accumulate at the downstream end of the stack and block the access of fuel to the individual cells. Sleeve 32 is in communication with the inner edge of fuel flow field plate 14 in each fuel cell so that hydrogen is diffused along a surface of membrane 12 opposite the surface receiving oxygen that diffuses through oxygen flow field plate 18. Impermeable electrically conductive separator plate 34 separates flow fields in adjacent fuel cells when the cells are assembled into a stack. Separator plate 34 may extend radially from above the periphery of the stack to serve the additional function of a cooling fin.

Fuel or anode flow field plate 14 is a macroporous electrically conductive material having a relatively small thickness, e.g., about 0.5 mm; oxygen or cathode flow field plate 18 is a macroporous electrically conductive material having a relatively large thickness, e.g., about 2 mm. A suitable flow field material is a carbon-fiber based paper with about 70% porosity and a 30 mm mean pore diameter, such as available as Spectracarb 2050 from Spectracorp. Inc., Lawrence, Mass.

FIG. 2 depicts a cross-sectional view of an assembled fuel cell 40. Each unit fuel cell 42 includes air flow field plate 44 with its inner seal 46, catalyzed membrane assembly (membrane and electrode backings) 48, and fuel flow field plate 52 with outer seal 54, as discussed in FIG. 1. Inner seal 46 and outer seal 54 are not necessarily separate components, but may be formed by coating the appropriate edge portions with a sealant. Impermeable separator plates 56 separate adjacent unit fuel cells. As shown, separator plates 56 have an extended diameter to provide an additional function of a cooling fin during power generation.

The stack assembly is formed by clamping unit cells 42 together by end plate 58 and a second end plate (not shown) at the other end of the assembled stack. The end plates must be relatively rigid and be electrically conductive. In one embodiment a two part configuration is used where a light weight aluminum plate is backed by a thin current collector.

In a particular aspect of the present invention, the end plates are clamped together by a single bolt 62 along the axis of all of the stack components. In the embodiment shown in FIG. 2, fuel inlet port 64 introduces fuel into fuel flow field 60 for diffusion to sleeve 66 for axial annular distribution to fuel flow fields 52 in unit fuel cells 42. Sleeve 66 is formed from an insulating material and electrically isolated from all of the individual stack plates. As shown, the head of bolt 62 bears against washer stack 68 to compress O-ring 67 for sealing the stack and for clamping the stack. Washer stack 68 may be any convenient arrangement that maintains the sealing and clamping force over a range of operating temperatures. Where the end plates are conductive, at least one of the washers in washer stack 68 is non-conductive in order to electrically isolate the end plate from bolt 62.

It will be understood that the above description of the fuel cell stack and unit fuel cell components is to a preferred embodiment and the invention is not limited to the specific exemplary materials. For example, the porous flow-fields could be metal screens or bonded particles; the membrane assembly could use any number of low or high platinum loading technologies; the flow-fields and impermeable barrier could be a single, monolithic bipolar plate, and so forth.

Figure 3:
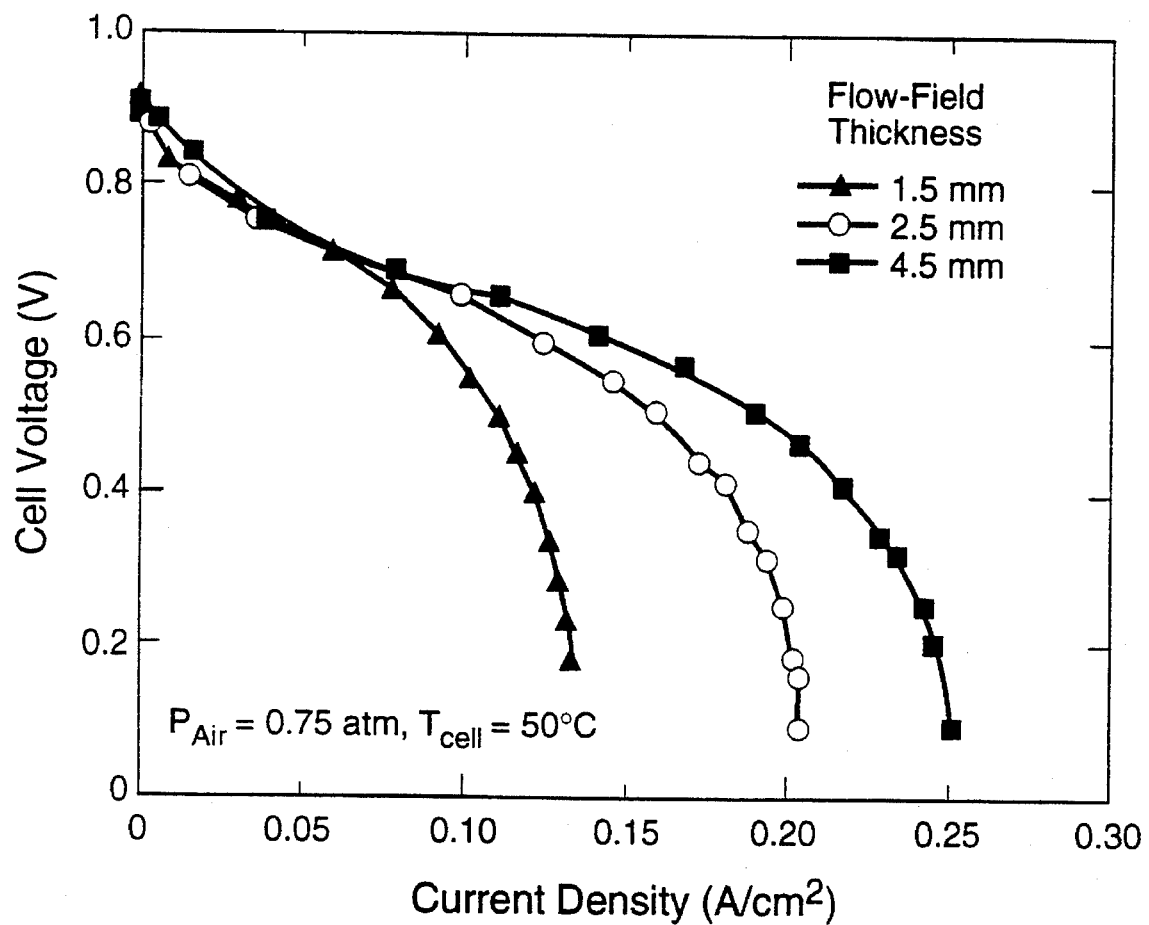
FIG. 3 graphically depicts single cell fuel cell performance at different cathode flow field thicknesses.

FIG. 3 graphically illustrates the performance of a single unit fuel cell at different oxygen/cathode flow-field thicknesses of 1.5, 2.5, and 4.5 mm. The unit cells were formed from a polymer electrolyte membrane catalyzed with thin-film catalyst layers with low platinum loadings (about 0.15 mg Pt/$cm^2$/electrode as described in U.S. Pat. Nos. 5,211,984 and 5,234,777, incorporated herein by reference). The catalyzed membranes were sandwiched between uncatalyzed ELAT backings (E-TEK, Inc., Natick, Mass.). The outside diameter of the hardware was about 5 cm and the cells had an active area of about 13 $cm^2$. The cells were operated at an ambient pressure of about 0.75 atm (ambient pressure at laboratory elevation). Hydrogen fuel was supplied to the annular plenum at 5 psig. The porous flow fields were formed from Spectracarb 2050 material, described above. The cells provided steady long-term performance, indicating that the cells were maintaining a sufficiently high hydration level for the membranes. As shown in FIG. 3, the thicker flow-fields provided higher currents when the temperatures were controlled around 50° C. and delivered about a watt of power at about 0.5V.

Figure 4:
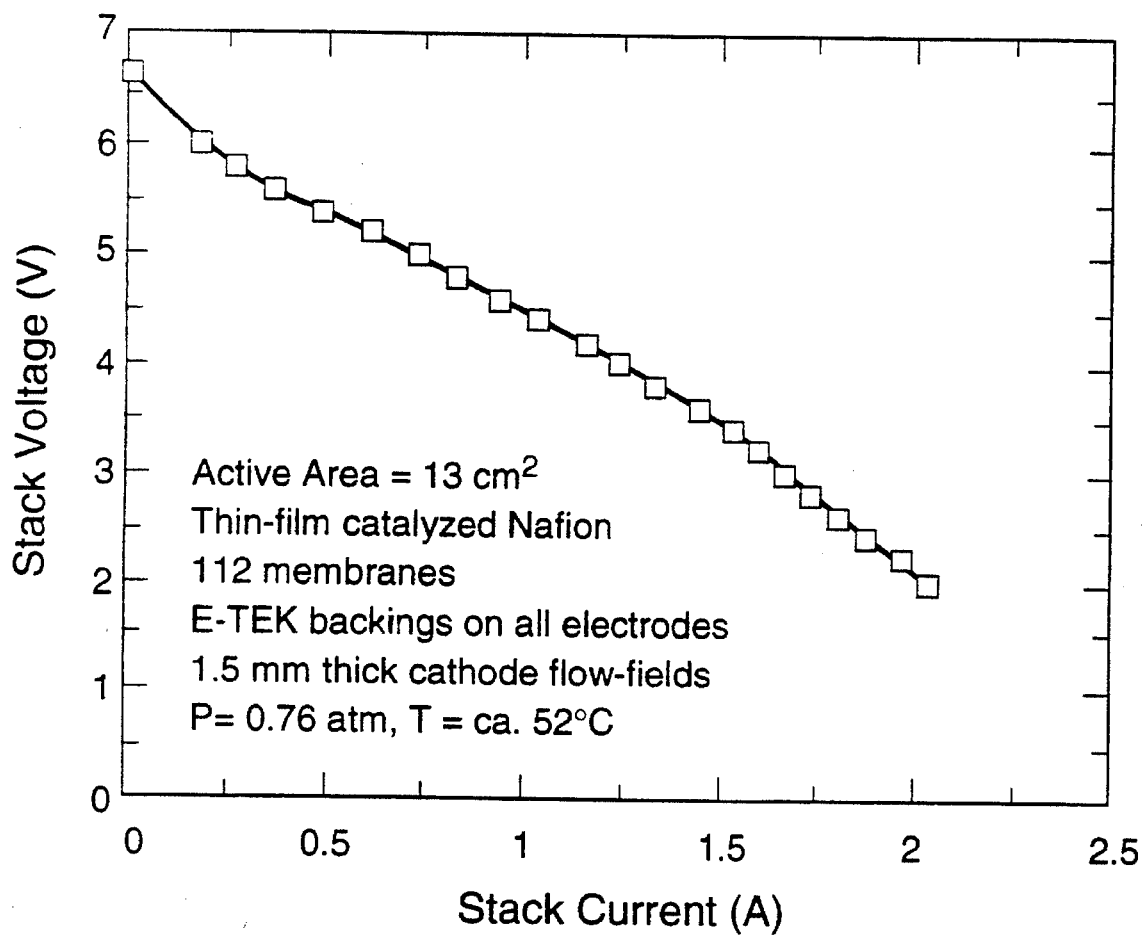
FIG. 4 graphically depicts the performance of an eight cell stack with 1.5 mm thick cathode flow fields.
Figure 5:
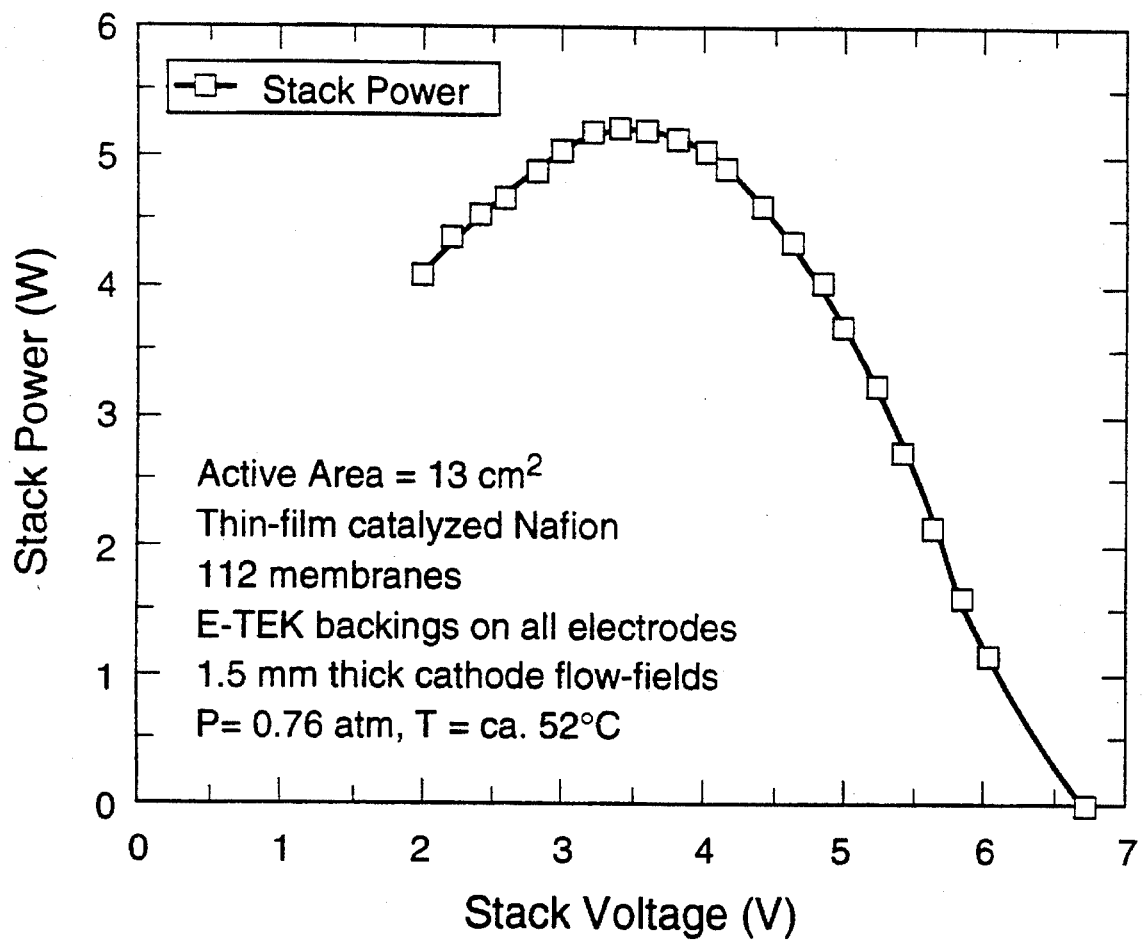
FIG. 5 graphically depicts the power yield of an eight cell stack with 1.5 mm thick cathode flow fields.

Typically, unit fuel cells are arranged in series to form a stack of cells for the delivery of more power and higher voltage. When the cells are stacked to output more power, the concerns of overheating and hence sufficient hydration become more significant. In FIG. 4 is shown a polarization curve of an eight cell stack for a cathode flow-field thickhesse of 1.5 mm. Every two cells were separated by impermeable stainless steel plates having a diameter of 6.4 cm vs. 5 cm for the unit cell and serve as cooling fins. The stack temperature rarely exceeded about 55° C. with the fins. The stack of unit cells is about 2 cm thick. The corresponding power output from the fuel cell stack is shown in FIG. 5. An output power up to 5 W was obtained at a cathode flow field thickness of 1.5 mm.

The power densities of the stacks do not suffer as the thickness of the unit cells is decreased because it is then possible to fit in more cells per unit stack volume. The drawbacks are that the device voltage increases with the increased number of cells and the device cost increases because of the increased number of components. If the performance of the 1.5 mm cells is maintained over a multi-cell stack, then 25 W could be delivered from a device with 40 cells that is about 6.4 cm (2.5 in) in diameter (including fins) and is 8 cm long, not including the contributions of the endplates and bolt.

It will be appreciated that one of the strengths of a fuel cell stack according to the present invention is that a very compact package can be provided. For example, an attractive package for using a small fuel cell system is a D-cell size stack combined with a metal hydride canister (HCl, Littleton, Colo.) that supplies 7.2 V, as is obtained from a six-pack of D-cell Nicad batteries. The sizes of the two systems are about the same, yet the fuel cell system yields more than three times more energy than the battery system (ca. 48 W hr vs. 15 W hr). Furthermore, a replacement hydride canister can be used immediately for continuous uninterrupted operation. It should be noted, however, that the fuel cell system is not capable of delivering power levels as high as nickel-cadmium batteries so it will not be an effective replacement for all applications.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A polymer electrolyte fuel cell comprising:

fuel cell components defining a periphery and distributed along a common axis, said fuel cell components comprising a polymer electrolyte membrane, an anode and a cathode contacting opposite sides of said membrane, and fuel and oxygen flow fields contacting said anode and said cathode, respectively, wherein said components define an annular region therethrough along said axis; and a fuel distribution manifold within said annular region connected to deliver fuel to said fuel flow field, wherein said fuel distribution manifold is a hydrophilic material for redistributing water produced by fuel and oxygen reacting at said cathode.

2. A polymer electrolyte fuel cell according to claim 1, wherein said fuel distribution manifold defines grooves extending in an axial direction along said annular region for transporting fuel.

3. A polymer electrolyte fuel cell according to claim 1, wherein said fuel flow field is sealed at said periphery of said fuel cell and said oxygen flow field is sealed at said annular region.

4. A polymer electrolyte fuel cell according to claim 2, wherein said fuel flow field is sealed at said periphery of said fuel cell and said oxygen flow field is sealed at said annular region.

5. A stack of polymer electrolyte fuel cells comprising:

a plurality of unit cells where each unit cell includes fuel cell components defining a periphery and distributed along a common axis, said fuel cell components comprising a polymer electrolyte membrane, an anode and a cathode contacting opposite sides of said membrane, and fuel and oxygen flow fields contacting said anode and said cathode, respectively, wherein said components define an annular region therethrough along said axis; and a fuel distribution manifold within said annular region connected to deliver fuel to said fuel flow field in each of said unit cells, wherein said fuel distribution manifold is a hydrophilic-like material for redistributing water produced by fuel and oxygen reacting at said cathode.

6. A stack of polymer electrolyte fuel cells according to claim 5, wherein said fuel distribution manifold defines grooves extending in an axial direction along said annular region for transporting fuel.

7. A stack of polymer electrolyte fuel cells according to claim 5, wherein said oxygen flow field is open at said periphery of said fuel cell components for oxygen movement from said periphery toward said annular region.

8. A stack of polymer electrolyte fuel cells according to claim 5, wherein said fuel flow field is sealed at said periphery of said fuel cell components and said oxygen flow field is sealed at said annular region.

9. A stack of polymer electrolyte fuel cells comprising:

a plurality of unit cells where each unit cell includes fuel cell components defining a periphery and distributed along a common axis, said fuel cell components comprising a polymer electrolyte membrane, an anode and a cathode contacting opposite sides of said membrane, and fuel and oxygen flow fields contacting said anode and said cathode, respectively, wherein said components define an annular region therethrough along said axis;

a fuel distribution manifold within said annular region connected to deliver fuel to said fuel flow field in each of said unit cells; and a fuel cell separator plate between each one of said unit cells and extending a distance beyond said unit cell periphery for removing heat from said unit cells.

10. A stack of polymer electrolyte fuel cells according to claim 9, wherein said oxygen flow field is open at said periphery of said fuel cell components for oxygen movement from said periphery toward said annular region.

11. A stack of polymer electrolyte fuel cells according to claim 9, wherein said fuel flow field is sealed at said periphery of said fuel cell components and said oxygen flow field is sealed at said annular region.

12. A stack of polymer electrolyte fuel cells according to claim 9, wherein said fuel distribution manifold is a hydrophilic material for redistributing water produced by fuel and oxygen reacting at said cathode.

13. A stack of polymer electrolyte fuel cells according to claim 9, wherein said fuel distribution manifold defines grooves extending in an axial direction along said annular region for transporting fuel.

14. A stack of polymer electrolyte fuel cells according to claim 9, further including two end plates for clamping together said fuel cell components, where at least one of said end plates includes a fuel inlet port.

15. A stack of polymer electrolyte fuel cells according to claim 14, further including a fuel inlet flow field for distributing fuel from said inlet port to said annular region.

16. A stack of polymer electrolyte fuel cells according to claim 14, further including a single clamping bolt extending through said annular region for urging said end plates together and clamping said fuel cell components therebetween.

* * * * *